(12) United States Patent
Harnett et al.

(10) Patent No.: US 8,484,230 B2
(45) Date of Patent: Jul. 9, 2013

(54) DYNAMIC PARSING RULES

(75) Inventors: Tim Harnett, Mountain View, CA (US); Achyutram Bhamidipaty, San Jose, CA (US); Abinas Tewari, San Jose, CA (US); Stephen Manley, Livermore, CA (US); Stephen Morgan, San Jose, CA (US); Peter Nicklin, San Jose, CA (US); Jean-Francois Roy, San Leandro, CA (US)

(73) Assignee: TIBCO Software Inc., Palo Alto, CA (US)

( * ) Notice: Subject to any disclaimer, the term of this patent is extended or adjusted under 35 U.S.C. 154(b) by 4 days.

(21) Appl. No.: 13/225,174

(22) Filed: Sep. 2, 2011

(65) Prior Publication Data

US 2012/0197914 A1    Aug. 2, 2012

Related U.S. Application Data

(60) Provisional application No. 61/380,152, filed on Sep. 3, 2010.

(51) Int. Cl.
*G06F 7/00* (2006.01)
*G06F 17/30* (2006.01)

(52) U.S. Cl.
USPC ....................................................... 707/755

(58) Field of Classification Search
None
See application file for complete search history.

(56) References Cited

U.S. PATENT DOCUMENTS

| | | | |
|---|---|---|---|
| 7,058,567 B2 * | 6/2006 | Ait-Mokhtar et al. | 704/9 |
| 2004/0044674 A1 * | 3/2004 | Mohammadioun et al. | 707/100 |
| 2005/0234893 A1 * | 10/2005 | Hirsch | 707/3 |
| 2005/0289168 A1 | 12/2005 | Green et al. | |
| 2007/0192309 A1 | 8/2007 | Fischer et al. | |
| 2009/0089252 A1 * | 4/2009 | Galitsky et al. | 707/3 |

OTHER PUBLICATIONS

PCT Notification of Transmittal of the International Search Report and the Written Opinion of the International Searching Authority, or the Declaration for Application No. PCT/US2011/050421, Mailed Jan. 2, 2012, 11 pages.

* cited by examiner

*Primary Examiner* — Uyen T. Le
(74) *Attorney, Agent, or Firm* — Fish & Richardson P.C.

(57) ABSTRACT

Methods, program products, and systems implementing dynamic parsing rules are disclosed. Log data from a variety of log producers can be parsed using parsing rules to generate information about an information system. The parsing rules can include system parsing rules and custom parsing rules. A state machine can be used to detect conflicts between various parsing rules. A central server can distribute the system parsing rules and custom parsing rules to one or more remote servers for distributed processing. In a hierarchical parsing system, a first tier parser can be used to identify types of sources generating the log data. Log data from each type of log source can be sent to a second tier parser that corresponds to the type of log source.

17 Claims, 8 Drawing Sheets

DYNAMIC PARSING RULES

CROSS REFERENCE TO RELATED APPLICATION

This application claims the benefit under 35 U.S.C. §119(e) of U.S. Patent Application No. 61/380,152, filed Sep. 3, 2010, entitled "Dynamic Parsing Rules," which is incorporated by reference herein in its entirety.

TECHNICAL FIELD

This disclosure relates generally to data management.

BACKGROUND

In a computer-based information system, devices (e.g., routers), operating systems (e.g., Linux and Windows operating systems), and applications (e.g., web and database servers) can generate significant amounts of log data. The data can be a basis from which operating information about the system can be retrieved.

Many existing tools (e.g., databases) can be used to analyze the data. These existing tools depend on the data having some structure. Unstructured data needs to be normalized for the operating information to be retrieved. To normalize data from different sources and having different formats can require a different normalization rule for each device, operating system, and application.

SUMMARY

Methods, program products, and systems implementing dynamic parsing rules are disclosed. Log data from a variety of log producers can be parsed using parsing rules to generate information about an information system. The parsing rules can include system parsing rules and custom parsing rules. A state machine can be used to detect conflicts between various parsing rules. A central server can distribute the system parsing rules and custom parsing rules to one or more remote servers for distributed processing. In a hierarchical parsing system, a first tier parser can be used to identify types of sources generating the log data. Log data from each type of log source can be sent to a second tier parser that corresponds to the type of log source. The parsing of log data can produce named values. The named values can be customized using a tag catalog, which can provide penalty-free changing of names in the named values.

These and other implementations can be utilized to achieve one or more of the following advantages. A system implementing dynamic parsing technology can deliver a comprehensive solution to help users of an information system to structure raw data while maintaining high performance and scalability even in large and complex environments. For example, dynamic parsing rules can be advantageous in an information system that includes multiple and diverse log sources. Data from multiple log sources can be normalized and stored in a uniform, centralized data store to be retrieved by general query. For example, if a "user" or "transaction ID" data field is commonly identified across disparate log sources, dynamic parsing rules can enable a system administrator to track a user or transaction across the entire infrastructure of information system.

Dynamic parsing rules can provide flexibility. Users often incorrectly tag or categorize some of the values in a system. A currently preferred structure often changes in the future. Dynamic parsing rules provide features to adjust a tag or categorization that the users previously gave to certain fields having a specific message pattern. Features of dynamic parsing rules can ensure new log data be tagged or categorized appropriately, while allowing historical data to be instantly re-tagged or re-categorized and be immediately accessible.

The details of one or more implementations of dynamic parsing rule techniques are set forth in the accompanying drawings and the description below. Other features, aspects, and advantages of dynamic parsing rule will become apparent from the description, the drawings, and the claims.

BRIEF DESCRIPTION OF THE DRAWINGS

Like reference symbols in the various drawings indicate like elements.

DETAILED DESCRIPTION

Log Processing System Overview

Figure 1:
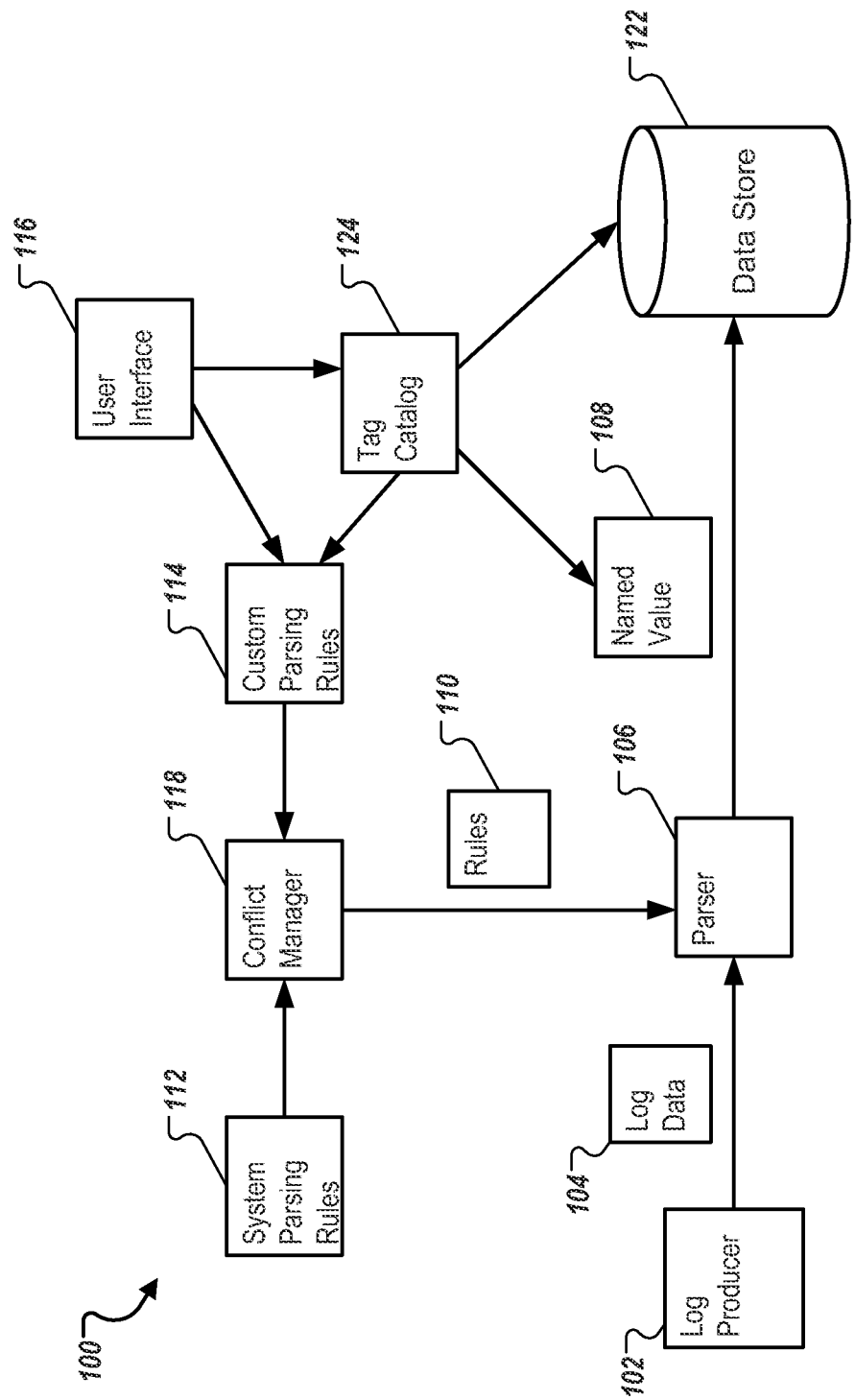
FIG. 1 is a block diagram illustrating an exemplary log processing system implementing dynamic parsing rules.

FIG. 1 is a block diagram illustrating exemplary log processing system 100 implementing dynamic parsing rules. System 100 can include one or more log producers 102 that can produce log data 104. Log producer 102 can include computer instructions that are configured to gather various log data from a log source and send the gathered log data for processing. The log source can include a log producing device or application. A log producing device or application can correspond to multiple log producers. For example, a web server device can include one or more system log producers producing operating system log data and one or more web server log producers producing web server log data.

Log data 104 can include one or more data messages. Each data message can include information that describes an event that has occurred at the log source and has been recorded by the log producer. Some exemplary data messages are error messages, warning messages, debugging messages, database access messages, and web access log messages. The data message can be an unstructured message (e.g., a text description of the event). The data message can include various values describing the event, for example, timestamp, a user identifier, an event type code, or an identity of the log producer or log source. The identity of the log source can include an Internet protocol (IP) address or a media access control (MAC) address. Each log producer can produce data messages that have a format that correspond to the log source. For example, a data message from a web access log can have a format different from a data message from a database access log.

System 100 can include parser 106 that can extract named value 108 from log data 104. Named value 108 can include an association between a name (e.g., "transaction ID" or "user") to a value (e.g., "12345" or "janedoe"). The value can be extracted from log data 104. Extracting the value from log data 104 can include identifying a section of an unstructured data message that represents the value. To identify the section (e.g., "janedoe") of an unstructured data message that corresponds to the name (e.g., "user"), parser 106 can apply one or more dynamic parsing rules 110 to the unstructured data message. Dynamic parsing rules 110 can include one or more matching rules that matches strings. In some implementations, the matching rules can be written as a regular expression (regex or regexp).

Dynamic parsing rules 110 can include system parsing rules 112 and custom parsing rules 114. System parsing rules 112 can associate sections of the data message that match a pattern in a regular expression with a name. In some implementations, system parsing rules 112 can include regular expressions for matching known and often encountered patterns, e.g., IP addresses, date and time, email addresses. For example, a rule can specify that any section of the data message matching the following pattern be associated with a name "IP address":

(\[0-9]{1,3})\.(\[0-9]{1,3})\.(\[0-9]{1,3})\.(\[0-9]{1,3})

Dynamic parsing rules 110 can include custom parsing rules 114 that are created by a user or imported from an external process or library. Custom parsing rules 114 can include user created regular expressions. In some implementations, custom parsing rules 114 can be created automatically, based on a user selection of a section of a data message. For example, user interface 116 of system 100 can provide for display one or more data messages of log data 104. User interface 116 can allow the user to select (e.g., by highlighting) a section of a data message. Based on the selected section of the data message, a pattern generator can automatically generate a message pattern. The message pattern can be associated with a name. The message pattern can be added to a pattern data store that can include pre-defined patterns. The pattern data store can allow a user to have a repository of commonly used patterns in a customized environment.

System 100 can include conflict manager 118. Conflict manager 118 can examine various parsing rules, including system parsing rules 112 and custom parsing rules 114, to determine whether a conflict exists. A conflict can exist when a section of a data message matches two different parsing rules and can be associated with more than one name (e.g., "IP address" and "server address"). If a conflict exists, conflict manager 118 can remove the conflict (e.g., by excluding the conflicting custom rule) or prompt a user to remove the conflict. Conflict manager 118 can provide combined parsing rules 110 to parser 106 for parsing and normalizing log data 104.

Parser 106 can instantiate a state machine (e.g., a deterministic finite automaton (DFA)) to identify each data message in log data 104 and extract the named values 108. For example, based on parsing rules 110, parser 106 can parse log data 104 and extract from a data message containing a text string "1283361690 192.168.1.109 janedoe" the following exemplary named values:

Date: Sep. 1, 2010
Time: 17:21:30
IP Address: 192.168.1.109
User: janedoe

Parser 106 can convert a segment of the text string ("1283361690") that matches a coordinated universal time (UTC) pattern into named values Sep. 1, 2010 ("date") and 17:21:30 ("time"). During extraction, other conversion, decryption, and decompression can be performed according to parsing rules 110. Extracted named values 108 can be stored in data store 122 for further processing.

In some implementations, system 100 can include tag catalog 124. Tag catalog 124 can store a list of names, also referred to as tags or labels, for naming values. Tag catalog 124 can perform functions including helping a user creating custom parsing rules 114, enabling penalty-free name changing of named value 108.

When a user identifies a component of a data message that the user wishes to structure, user interface 116 can provide a choice to select a pre-existing name from tag catalog 124. If the user cannot find a match, the user can create a name to be associated to a message pattern. Multiple users can set up names for each application or device. Re-using names in tag catalog 124 can reduce the expansion of quantity of names.

Tag catalog 124 can be used to facilitate name changing of named values 108. For example, tag catalog 124 can store the name "user" that is currently associated with values "janedoe," "johndoe," etc. To change the name associated with the values to "customer," a user can access user interface 106 to change the name from "user" to "customer" in tag catalog 124, instead of directly accessing data store 122 where named values 108 are stored.

Exemplary Hierarchical Log Processing System

Figure 2:
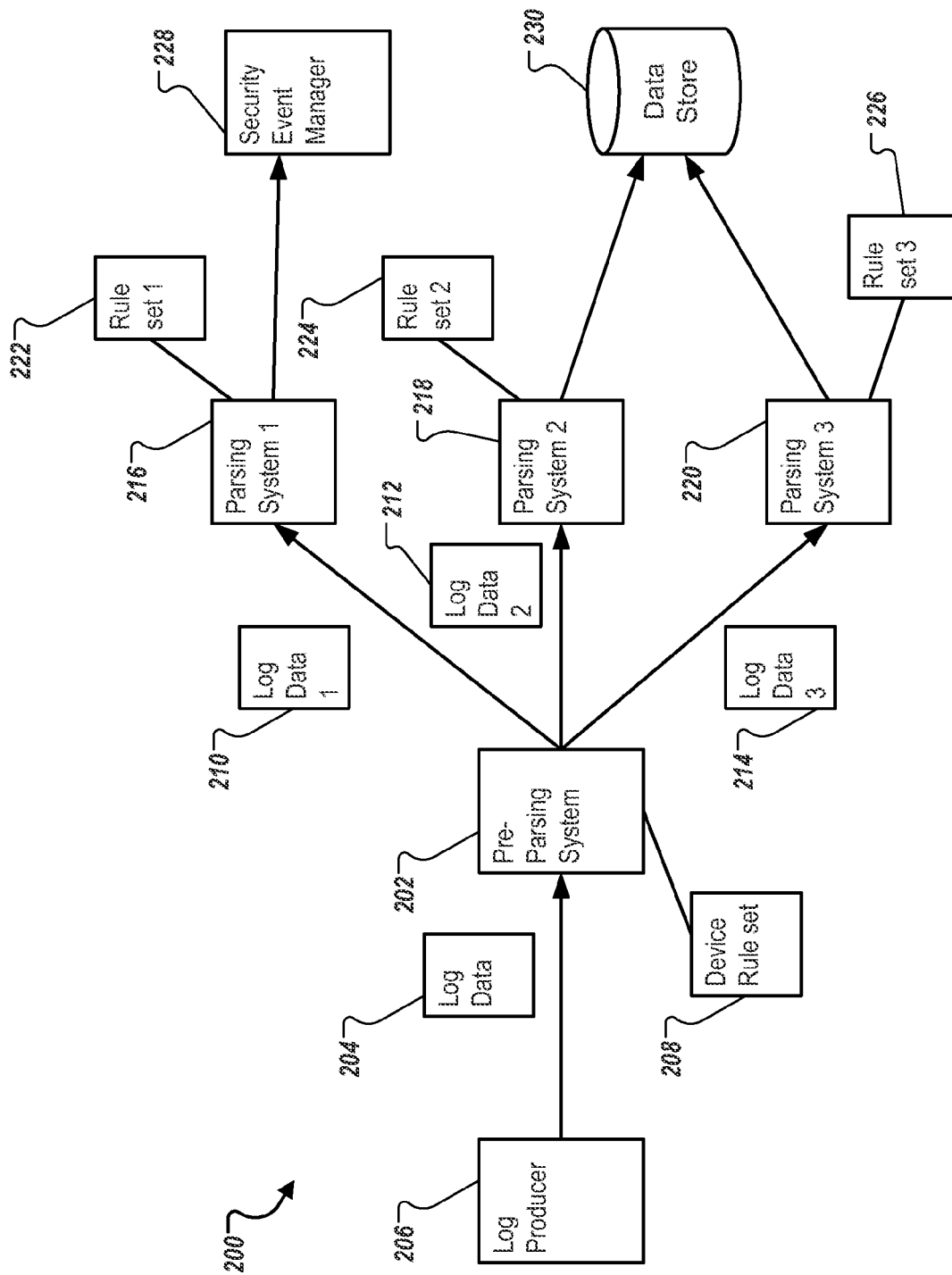
FIG. 2 is a block diagram illustrating an exemplary hierarchical log processing system.

FIG. 2 is a block diagram illustrating exemplary hierarchical log processing system 200. Hierarchical log processing system 200 can include multiple hierarchies, or tiers, of parsers.

A first tier parser can include pre-parsing system 202. Pre-parsing system 202 can include a hardware component, a software component, or both. Pre-parsing system 202 can receive log data 204 from a log producer 206 or one or more intermediaries (e.g., a universal data collector that can collect and combine log data from multiple log producers) connecting log producer 206 and pre-parsing system 202. Log data 204 can include one or more data messages.

Pre-parsing system 202 can use a state machine (e.g., a DFA) to automatically identify a type of log source of a data message. A log source can be a device, operating system, or application program. A log source can be, but need not be, a log producer. Example log sources include a Cisco™ router, a Windows™ server, or an Apache™ application.

The state machine of pre-parsing system 202 can use device rule set 208 to distinguish each type of log source. Device rule set 208 can include parsing rules that allow the state machine to provide collision detection. The collision detection can ensure that each type of log source, or in some implementations, each log source, is uniquely identified. The log sources can include pre-defined log sources and dynamically created log sources.

Based on matching performed by pre-parsing system 202, log data 204 can be routed to multiple secondary and tertiary layers or parsing and processing. The different parsing rules for 204 can include log data 204 to be sent to second-tier parsing systems for further processing. The second-tier parsing systems can include parsing systems 216, 218, and 220.

Each of parsing systems 216, 218, and 220 can be performance-tuned to process log data from a specific type of log source or for a specific type of processing destination. For example, parsing system 216 can utilize rule set 222 that includes highly-tuned and efficient hand-crafted parsing rules for most common devices or devices producing most log data. Parsing system 218 can use DFA technology, which can be memory-intensive, to handle dynamically added parsing rules 224. Parsing 220 can use parsing rules 226 that includes a combination of hand-crafted parsing rules and the dynamically added parsing rules.

Each of parsing systems 216, 218, and 220 can produce named values. The named values can be sent to various destinations for processing or storage. For example, named values from parsing system 216 can be sent to security event manager 228. Named values from parsing systems 218 and 220 can be stored in data store 230.

Figure 3:
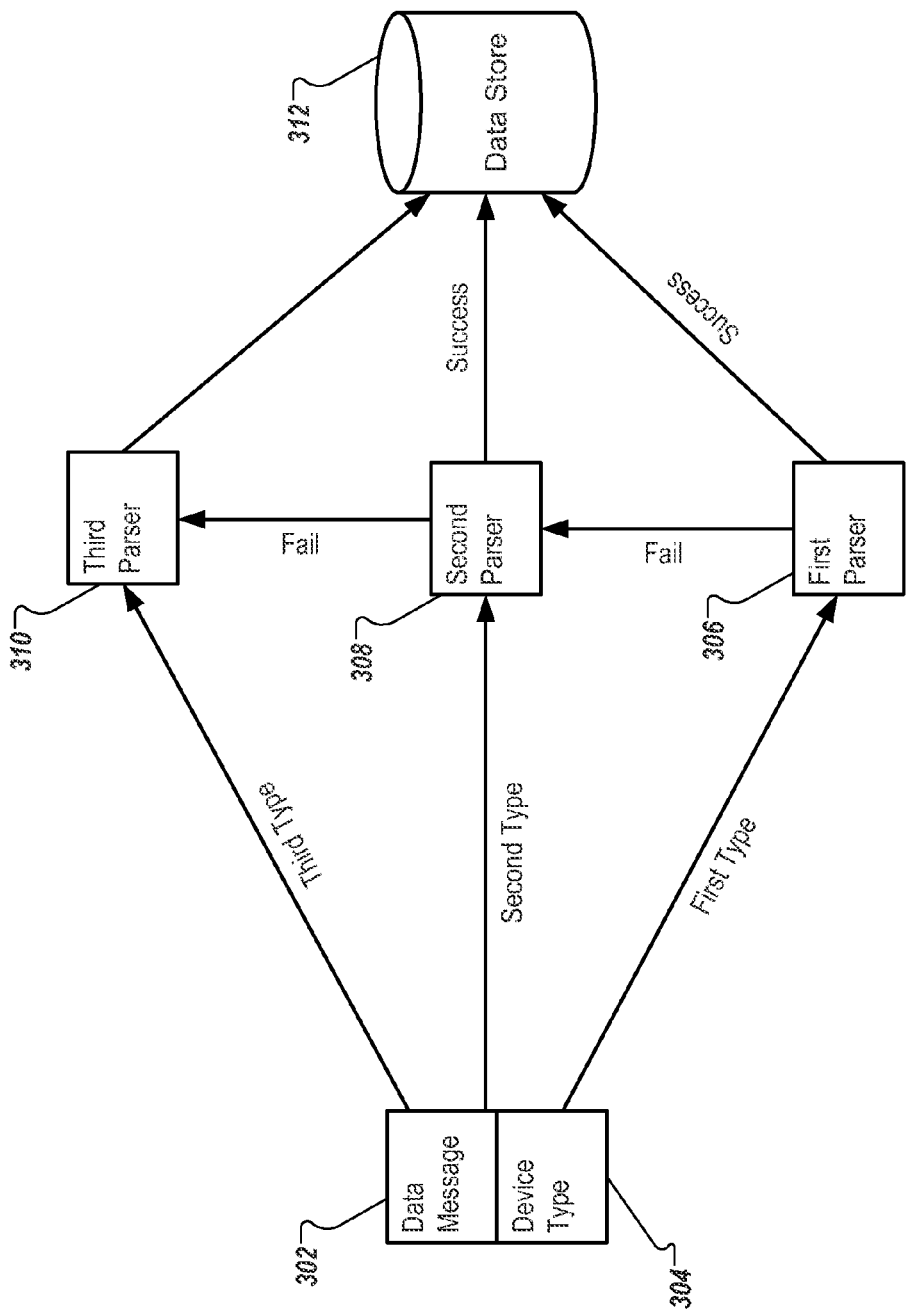
FIG. 3 is a block diagram illustrating dynamic selection of parsing systems.

FIG. 3 is a block diagram illustrating dynamic selection of parsing systems. Data message 302 can be part of log data. Data message 302 can be associated with device type 304. Device type 304 can have an alphanumeric value indicating a type of log source of data message 302. Based on device type 304, data message 302 can be sent to different parsers 306, 308, and 310. If device type 304 indicates that the log source has a first device type, data message 302 can be sent to first parser 306 for parsing. First parser 306 can include highly-tuned, predefined parsing rules. If data message 302 is successfully parsed by first parser 306, resulting named values can be stored in data store 312.

If device type 304 indicates that the log source of data message 302 has a second device type, or if data message 302 failed first parser 306, data message 302 can be sent to second parser 308. Second parser 308 can include the parsing rules of first parser 306 and other generic parsing rules, e.g., parsing rules that are less-tuned than the rules of first parser 306 but can match more message patterns than the parsing rules of first parser 306. If data message 302 is successfully parsed by first parser 308, resulting named values can be stored in data store 312.

If device type 304 indicates that the log source of data message 302 has a third device type, or if data message 302 failed second parser 308, data message 302 can be sent to third parser 308. Third parser can include the parsing rules of first parser 306 and second parser 308, and customized parsing rules. The customized parsing rules can include, for example, a customized DFA. The customized parsing rules can include rules for handling various security events.

Dynamic selection of parsers 306, 308, and 310 can provide a configurable balance between flexibility, performance, and user demand. For example, data message 302 can be sent to first parser 306 where parsing performance is highest due to fixed parsing rules. Data message 302 can be sent to second parser 308 and third parser 310 where more computing resources are involved to support more comprehensive and flexible parsing. Each of the parsers 306, 308, and 310 can be configured to follow a limitation of resource consumption (e.g., memory usage or network bandwidth usage), thus allowing consistent system performance for all data processing.

Exemplary Conflict Manager

Figure 4:
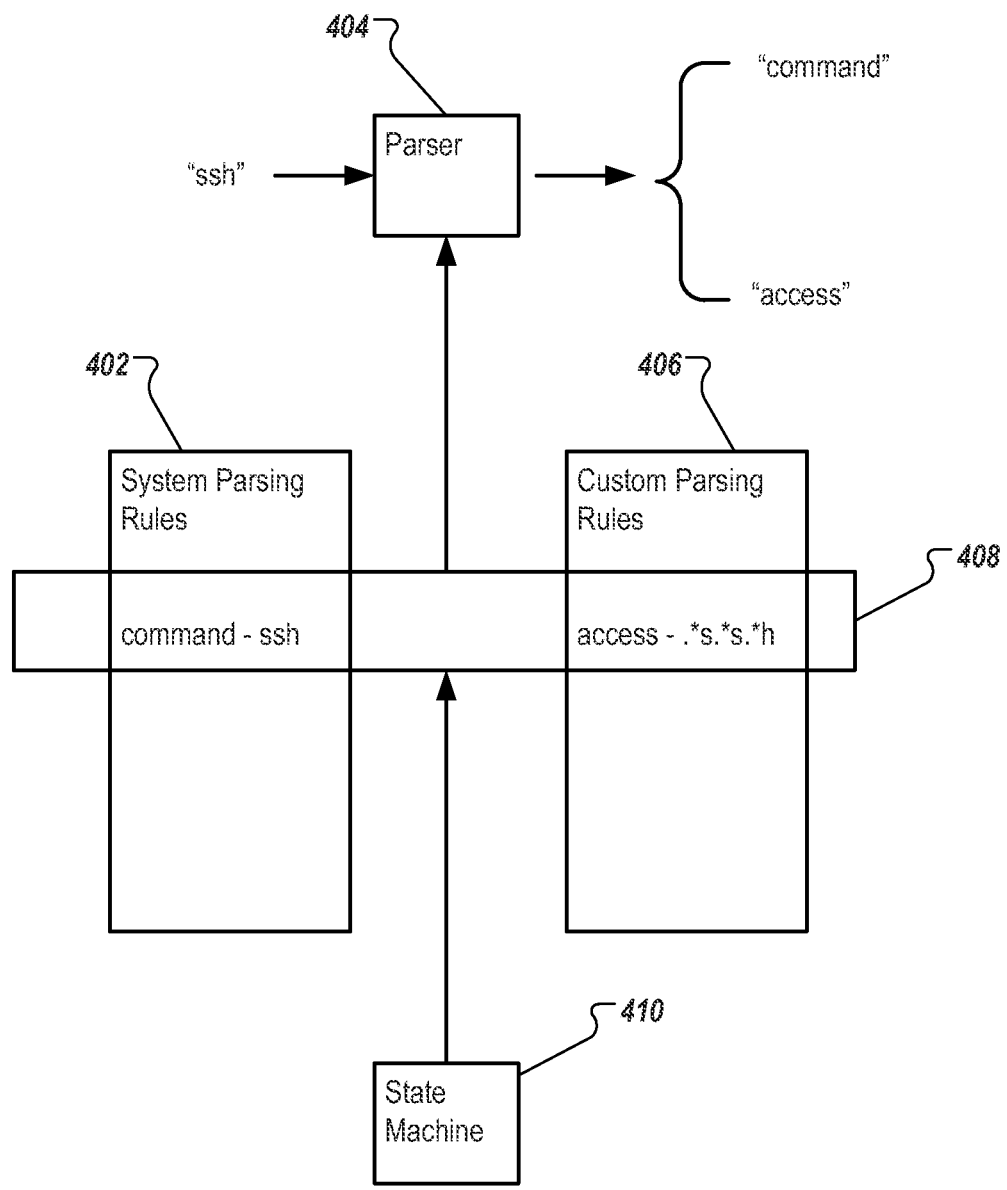
FIG. 4 is a graph illustrating an exemplary parsing rule conflict manager.

FIG. 4 illustrates an exemplary parsing rule conflict manager. A parsing rule conflict manager can detect a conflict between parsing rules. Two parsing rules can conflict if the components of that data message that are to be extracted can apply to more than one message type, resulting in more than one result. Due to the customizable nature of the parsing rules, a custom parsing rule can conflict with another custom parsing rule or with a pre-defined system parsing rule. Two parsing rules can conflict if the patterns in the rules are literally identical, or literally dissimilar but can produce the same result nonetheless.

For example, system parsing rules 402 can include a parsing rule that specifies that a literal "ssh" is associated to a name "command." Parser 404 parsing data message that includes the text "ssh" using system parsing rules 402 can generate a value "ssh" having a name "command."

Exemplary custom parsing rule 406 can include a parsing rule that specifies that a pattern ".*s.*s.*h" is associated to a name "access." Parser 404 parsing data message that includes the text "ssh" using system parsing rules 402 can generate a value "ssh" having a name "access." Conflict 408 exists, since the same text segment "ssh" corresponds to two interpretations.

State machine 410 can be utilized to detect conflict 408. State machine 410 can include a DFA. The DFA can accept strings of symbols. The DFA can have a start state and one or more end states. The DFA can determine which rule caused which end state to come into existence. If two rules come to the same end state, this identifies a conflict. The conflict manager can be configured to perform various actions after conflict 408 is detected. For example, the conflict manager can deactivate one of the conflicting rules based on a priority of the rule. The conflict manager can provide the conflict to a user creating the customized the rule and allow the user to refine the rules. If a conflicting rule is a custom parsing rule automatically created based on a user selection of a section of a data message, the conflict manager can request the user to refine the rule by selecting more sections of the data message to disambiguate the different rules. In some implementations, state machine 410 can include a non-deterministic finite automaton (NFA).

Exemplary Rule Distribution System

Figure 5:
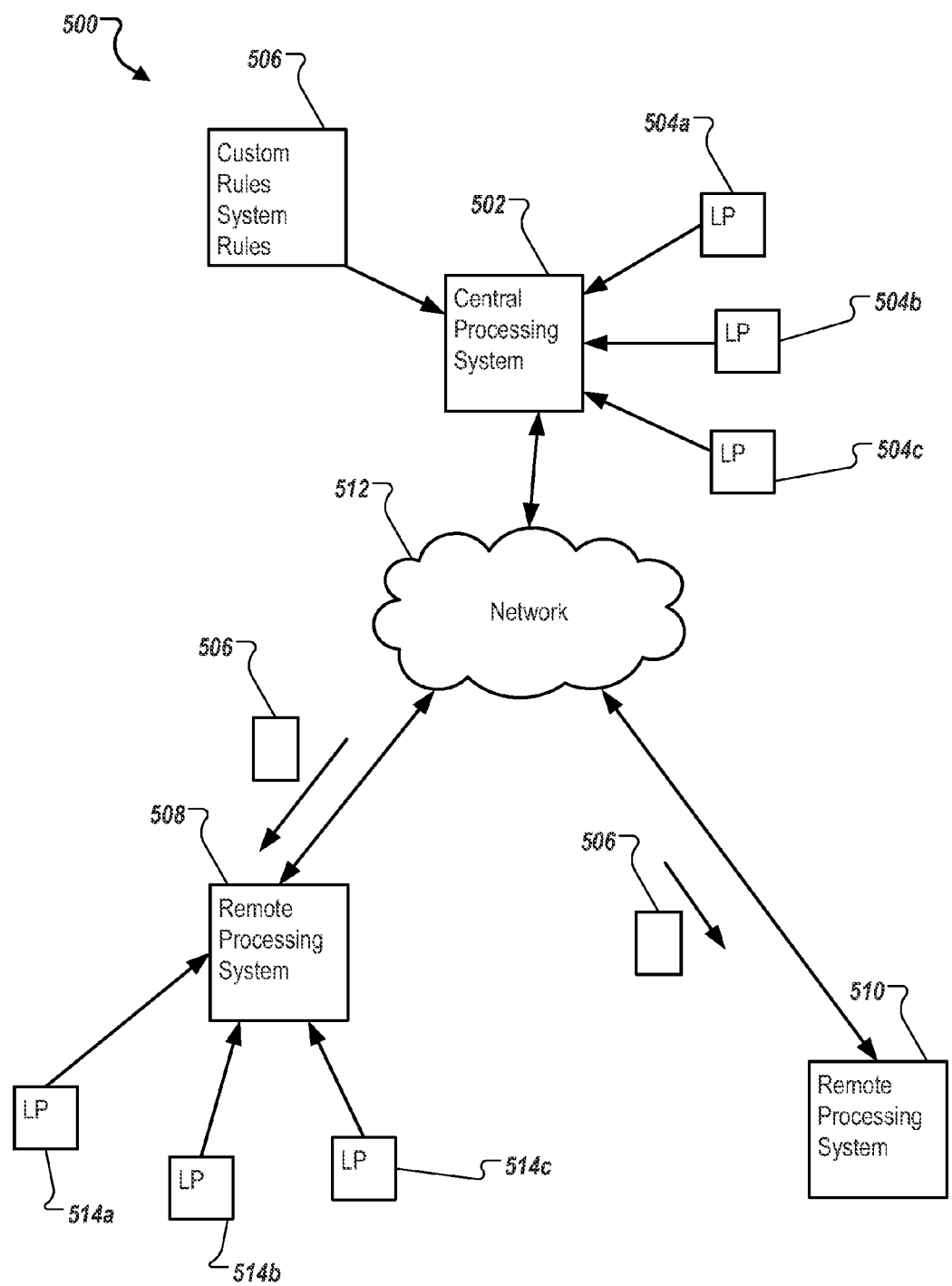
FIG. 5 is a block diagram illustrating an exemplary distribution system distributing parsing rules.

FIG. 5 illustrates exemplary system 500 where parsing rules are distributed. In a large information system, multiple log processing systems can be present. For example, a large corporation can have multiple offices distributed in multiple cities. Each of the offices can have multiple log sources and log producers. Central processing system 502 can include a log processing system where creation of parsing rules is centralized. Central processing system 502 can be connected to one or more log producers 504a, 504b, and 504c through a first network (e.g., a local area network (LAN)). Central processing system 502 can include parsing rules 506, which can include system parsing rules and custom parsing rules.

Central processing system 502 can be connected to remote processing systems 508 and 510 through second network 512. The second network can include a wide area network (WAN). Remote processing systems 508 and 510 each can be connected to one or more log producing devices. For example, remote processing system 508 can be connected to one or more log producers 514a, 514b, and 514c through a second LAN.

Central processing system 502 can distribute parsing rules 506 to remote processing systems 508 and 510 through second network 512. As a result, a user can have a common structure, including common parsing rules 506, across system 500. Having the common structure can be beneficial, allowing consistency of log data parsing in all systems. For example, a security event in the log data can have a consistent name in central processing system 502, remote processing system 508, and remote processing system 510. In response to a query "user: janedoe," system 500 can identify each "janedoe" who accessed any device or application in other offices.

System 500 can be configured that each of central processing system 502, remote processing system 508, and remote processing system 510 can identify a master of parsing rules 506. Once the master (e.g., central processing system 502) is identified, all other systems can accept message patterns from the master, and can be prevented from creating their own message patterns.

Exemplary Tag Catalog

Figure 6:
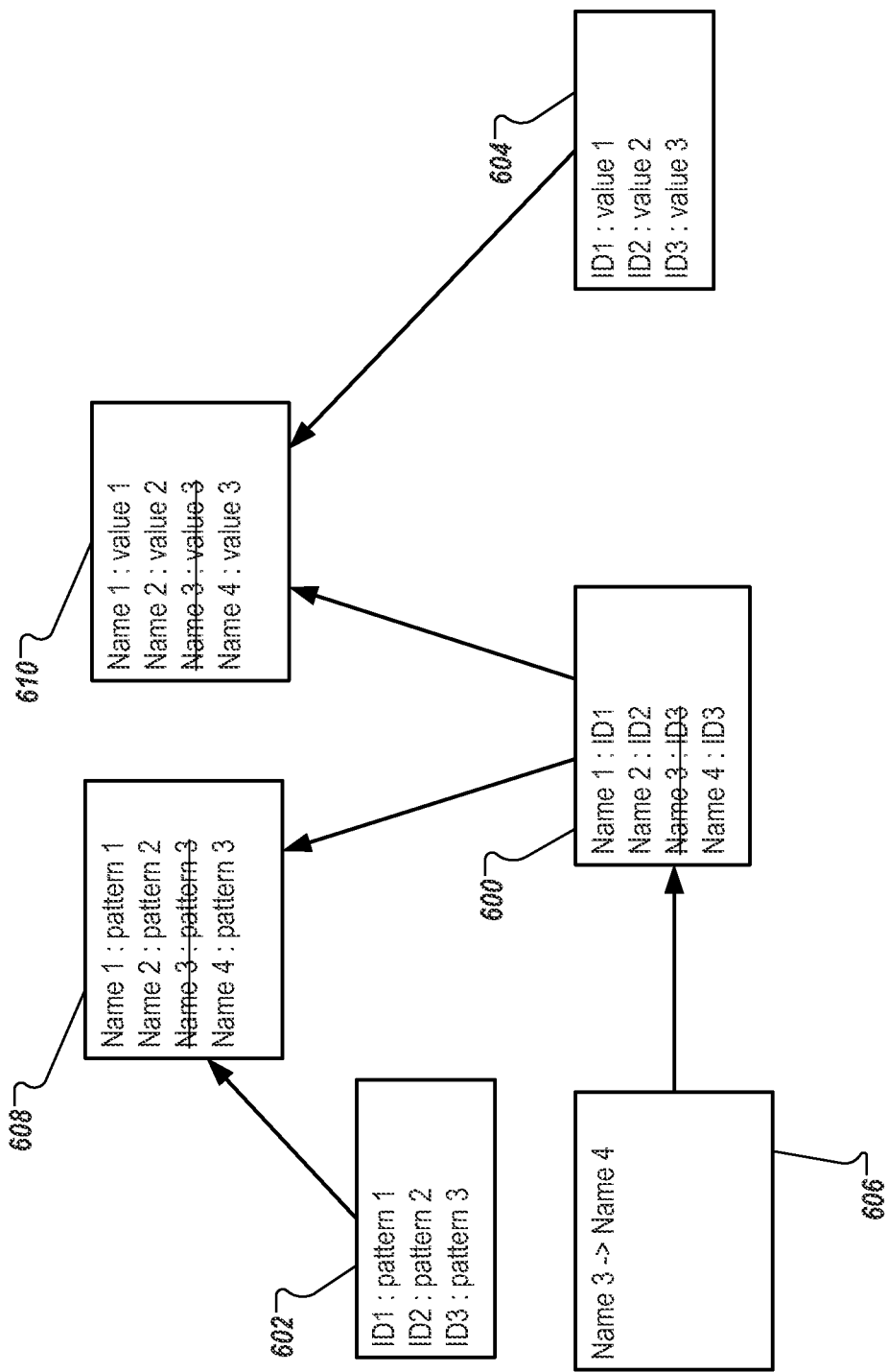
FIG. 6 is a graph illustrating exemplary implementations of a tag catalog.

FIG. 6 illustrates exemplary implementations of tag catalog 600. Tag catalog 600 can include a layer of indirection between names and a name identifier stored with data. A name, or a tag, can be any information associated with a message or a value. The name can include, for example, a category of values. In dynamic parsing rules, a name can be customizable. For example, the name can be changed from "users" to "users-San Jose."

Tag catalog 600 can map a name to a name identifier. In parsing rules 602, the name identifier can be associated with a message pattern. In data store 604, the name identifier can be associated with one or more values corresponding to the message pattern. When a user accesses data by name, a log processing system can retrieve one or more name identifiers corresponding to the name, and retrieve one or more patterns based on the name from parsing rules 602. The system can search for the names corresponding to the message pattern across all data of data store 604.

Names of tag catalog 600 can be changed, for example, by an administrator. User interface 606 can be provided to the administrator for changing names. When a name is changed (e.g., from "name 3" to "name 4"), the system can change the mapping from tag catalog 600 to the message pattern (e.g., "pattern 3") that is linked to the name by a name identifier (e.g., "ID3"). Underlying data, including data stored in data store 604, need not be changed.

User interface 608 for displaying parsing rules can access stored parsing rules 602 and tag catalog 600. After the name change, user interface 608 can provide for display a message pattern (e.g., "pattern 3") in association with the changed name (e.g., "name 4"). Likewise, user interface 610 for displaying data can provide for display a value (e.g., "value 3") in association with the changed name.

User interface 610 can provide for display formatted name-value pairs. User interface 610 can enable the display of multiple different names in a same display column. The system can create dynamic groups among names. For example, a group "user" can include sub-groups "user-San Jose" and "user-Paris." The sub-groups can roll up, or merge, to become a single group. Tag catalog 600 can allow dividing and merging without re-indexing data of data store 604, storing multiple names for a single piece of data, and other system overheads.

In some implementations, a group can be split into multiple sub-groups without penalty. For example, a group "user" can be changed to one of the sub-groups "user-San Jose" and "user-Paris." Upon the split, a search for "user-San Jose" can be performed. In some implementations, the system can normalize the names. For example, in normalization, spaces can be removed. The name "user-San Jose" can be normalized into "user-SanJose."

Tag catalog 600 can include security settings for each name. When running a search, the security settings can cause one or more names to be omitted or obscured to prevent access to certain data. The security settings can allow access management without modifying either raw log data or structured and indexed data stored in data store 604. The security settings can allow centralized management of access using role-based control on the system. For example, a group "x" can be configured not to be able to access a social security number or a credit card number across all log sources. A group "y" can be configured to be able to access web access data from only a selected portion of log sources. A group "z" can be configured to be able to access certain data, where the data are redacted when presented.

Exemplary Processes Implementing Dynamic Parsing Rules

Figure 7:
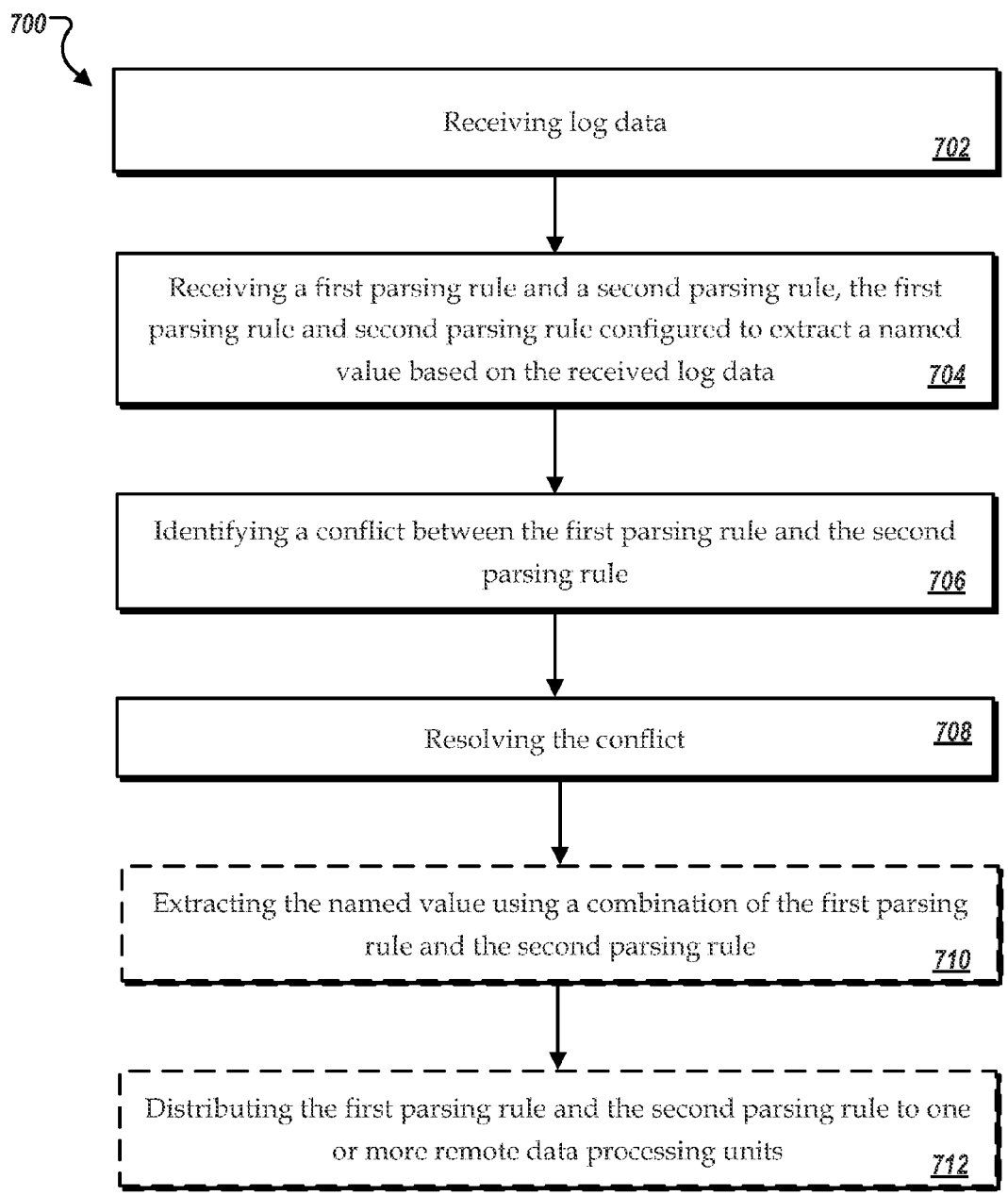
FIG. 7 is a flowchart illustrating an exemplary process of the dynamic parsing rule techniques.

FIG. 7 is flowchart illustrating exemplary process 700 of the dynamic parsing rule techniques. For convenience, process 700 will be described in reference to a system implementing exemplary process 700. The system can include one or more data processing devices.

The system can receive (702) log data. Receiving the log data includes receiving one or more unstructured data messages from one or more log producers over a first network (e.g., a LAN). Each data message can have a unique format specific to the log producer that produced the data message.

The system can receive (704) a first parsing rule and a second parsing rule, the first parsing rule and second parsing rule configured to extract a named value based on the received log data. Receiving the first parsing rule can include receiving a tag and an expression. The tag can be a name to be used to name a value. The expression can include a pattern for identifying the value corresponding to the name. Receiving the second parsing rule can include receiving a user-created parsing rule. Receiving the user-created parsing rule can include receiving a user selection of a portion of a data message included in the data log. The system can generate a message pattern based on the user selection. The system can designate a user-created tag and the message pattern as the user created parsing rule.

The system can identify (706) a conflict between the first parsing rule and the second parsing rule. Identifying the conflict can include instantiating one or more state machines based on the first parsing rule and the second parsing rule. In some implementations, at least one of the state machines can include a DFA. Identifying the conflict can include identifying an end state that is reachable according to both the first parsing rule and the second parsing rule.

The system can resolve (708) the conflict. Resolving the conflict can include providing a user interface for modifying the second parsing rule. Providing the user interface can include requesting a user to select one or more sections of a data message based on which a message pattern can be created.

The system can extract (710) the named value using a combination of the first parsing rule and the second parsing rule. Extracting the named value can include associating a name specified in the first parsing rule or second parsing rule to an identifier. Extracting the named value can further include storing the identifier in association with a value that corresponds to the name according to the first rule or second rule. The value can be extracted from the log data. In some implementations, the system can store, in a tag catalog, the name and the associated identifier. The system can receive a new name for replacing the name. The system can associate the new name to the identifier. In some implementations, the system can associate a security setting to a name. The security setting can specify access privileges of a value that corresponds to the name. The system can store the security setting and the name in the tag catalog. The security setting can specify that the value is to be obfuscated or redacted if accessed by a type of user.

In some implementations, the system can optionally distribute (712) the first parsing rule and the second parsing rule to one or more remote data processing units. Distributing the first parsing rule and the second parsing rule can include identifying the system a master and the one or more remote data processing units as slaves, and pushing the first parsing rule and the second parsing rule from the master to the slaves.

In some implementations, process 700 can further include dynamically selecting parsers. Dynamically selecting parsers can include creating a first parser based on a first parsing rule, and creating a second parser based on the first parsing rule and a second parsing rule. Dynamically selecting parsers can include identifying a type of a data message included in the data log. Identifying the type of the data message can include identifying a device type of a device or application that generates the data message. Dynamically selecting parsers can include applying one of the first parser and the second parser to the data message based on the identified type.

Exemplary System Architecture

Figure 8:
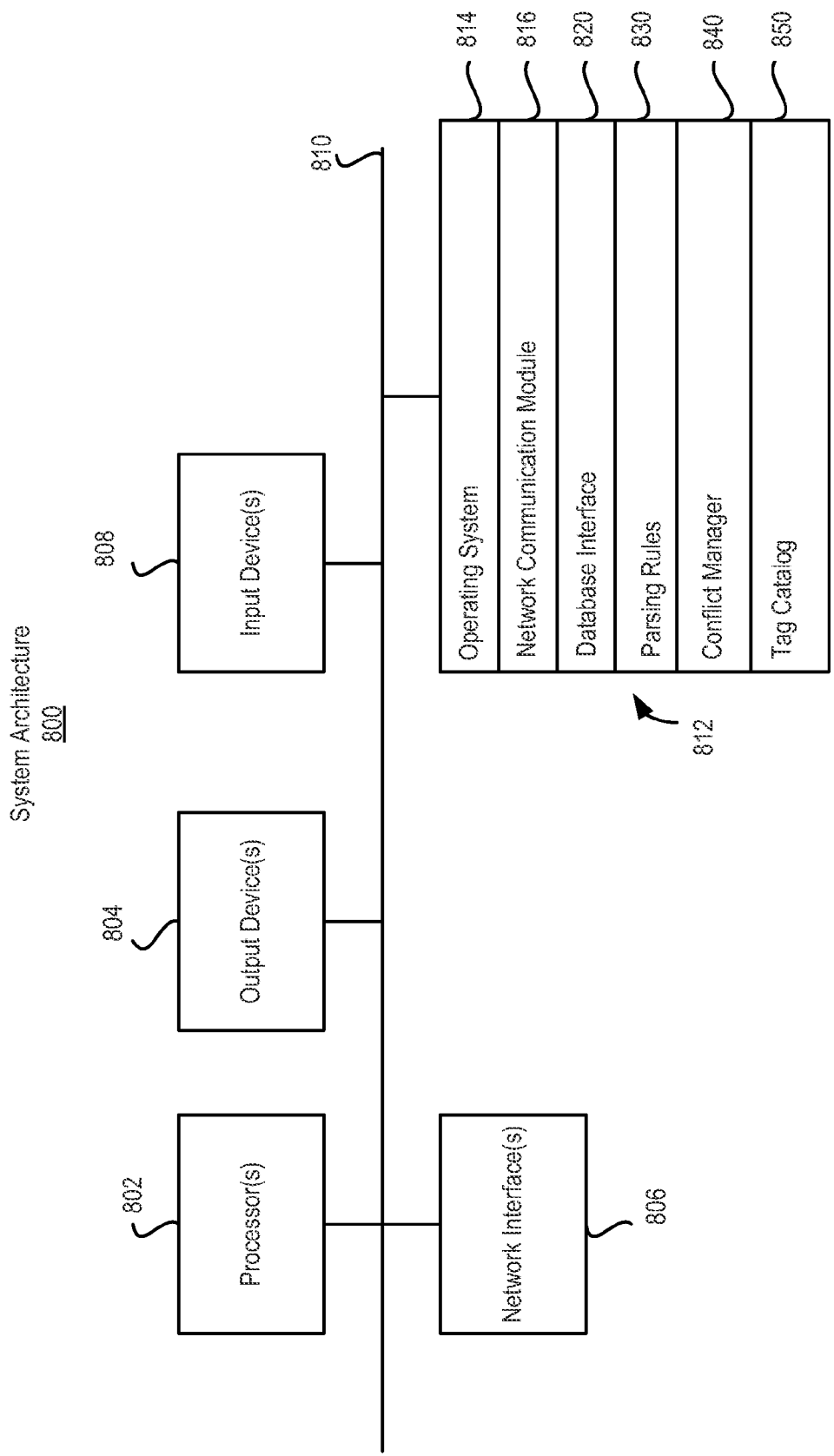
FIG. 8 is a block diagram of an exemplary system architecture for implementing the dynamic parsing rule features and operations.

FIG. 8 is a block diagram of an exemplary system architecture 800 for implementing the features and operations of dynamic parsing rule techniques. Other architectures are possible, including architectures with more or fewer components. In some implementations, architecture 800 includes one or more processors 802 (e.g., dual-core Intel® Xeon® Processors), one or more output devices 804 (e.g., LCD), one or more network interfaces 806, one or more input devices 808 (e.g., mouse, keyboard, touch-sensitive display) and one or more computer-readable mediums 812 (e.g., RAM, ROM, SDRAM, hard disk, optical disk, flash memory, etc.). These components can exchange communications and data over one or more communication channels 810 (e.g., buses), which can utilize various hardware and software for facilitating the transfer of data and control signals between components.

The term "computer-readable medium" refers to any medium that participates in providing instructions to processor 802 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 812 can further include operating system 814 (e.g., Mac OS® server, Windows® NT server), network communication module 816, database interface 820, parsing rules 830, conflict manager 840, and tag catalog 850. Database interface 820 can provide one or interfaces (e.g., database interfaces) to various data stores. Parsing rules 830 can include system parsing rules and custom parsing rules for parsing log data. Conflict manager 840 can be used to identify conflicts between parsing rules. Tag catalog 850 can include names used in implementing the dynamic parsing rule techniques.

Operating system 814 can be multi-user, multiprocessing, multitasking, multithreading, real time, etc. Operating system 814 performs basic tasks, including but not limited to: recognizing input from and providing output to devices 804 and 808; keeping track and managing files and directories on computer-readable mediums 812 (e.g., memory or a storage device); controlling peripheral devices; and managing traffic on the one or more communication channels 810. Network communications module 816 includes various components for establishing and maintaining network connections (e.g., software for implementing communication protocols, such as TCP/IP, HTTP, etc.). Database interface 820 can include interface to various databases including relational databases.

Architecture 800 can be included in any device capable of hosting a database application program. Architecture 800 can be implemented in a parallel processing or peer-to-peer infrastructure or on a single device with one or more processors. Software can include multiple software components or can be a single body of code.

The described features can be implemented advantageously in one or more computer program products that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), or plasma monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention. For example, log data are described. Dynamic parsing rules can be used to analyze data other than log data. For example, stock price data, news, electronic mail, and audio and video content can be analyzed using the techniques described. Accordingly, other implementations are within the scope of the following claims.

What is claimed is:

1. A method executed by one or more data processing devices, comprising:
   receiving log data;
   receiving a first parsing rule and a second parsing rule, the first parsing rule and second parsing rule configured to extract a named value based on the received log data;
   identifying a conflict between the first parsing rule and the second parsing rule;
   resolving the conflict; and
   extracting the named value using a combination of the first parsing rule and the second parsing rule.

2. The method of claim 1, where receiving the log data includes receiving one or more data messages.

3. The method of claim 1, where receiving the first parsing rule includes receiving a tag and an expression, the tag including a name corresponding to the value, the expression including a pattern for identifying the value corresponding to the name.

4. The method of claim 1, where receiving the second parsing rule includes receiving a user-created parsing rule.

5. The method of claim 4, where receiving the user-created parsing rule includes:
   receiving a user selection of a portion of a data message included in the data log;
   generating a message pattern based on the user selection; and
   designating a user-created tag and the message pattern as the user-created parsing rule.

6. The method of claim 1, where identifying the conflict between the first parsing rule and the second parsing rule includes:
   instantiating one or more state machines based on the first parsing rule and the second parsing rule; and
   identifying an end state that is reachable according to both the first parsing rule and the second parsing rule.

7. The method of claim 6, where at least one of the state machines includes a deterministic finite automaton (DFA).

8. The method of claim 1, where resolving the conflict includes providing a user interface for modifying the second parsing rule.

9. The method of claim 1, where extracting the named value includes:
   associating a name specified in the first parsing rule or second parsing rule to an identifier; and
   storing the identifier in association with a value that corresponds to the name according to the first rule or second rule, the value being exacted from the log data.

10. The method of claim 9, further comprising:
    storing, in a tag catalog, the name and the associated identifier;
    receiving a new name for replacing the name; and
    associating the new name to the identifier.

11. The method of claim 9, further comprising:
    associating a security setting to a name, the security setting specifying access privileges of a value that corresponds to the name; and
    storing the security setting and the name in a tag catalog.

12. The method of claim 11, where the security setting specifies that the value is to be obfuscated or redacted if accessed by a type of user.

13. The method of claim 12, where identifying the type of the data message includes identifying a device type of a device or application that generates the data message.

14. The method of claim 1, further comprising:
    creating a first parser based on the first parsing rule and a second parser based on the first parsing rule and the second parsing rule;
    identifying a type of a data message included in the data log; and
    applying one of the first parser and the second parser to the data message based on the identified type.

15. The method of claim 1, further comprising distributing the first parsing rule and the second parsing rule to one or more remote data processing units, the remote data processing units configured to receive and process second log data without creating conflicts in parsing rules.

16. A computer program product stored on a storage device, operable to cause one or more processors to perform operations comprising:
    receiving log data;
    receiving a first parsing rule and a second parsing rule, the first parsing rule and second parsing rule configured to extract a named value based on the received log data;
    identifying a conflict between the first parsing rule and the second parsing rule;
    resolving the conflict; and
    extracting the named value using a combination of the first parsing rule and the second parsing rule.

17. A system comprising:
    one or more processors configured to perform operations comprising:
    receiving log data;
    receiving a first parsing rule and a second parsing rule, the first parsing rule and second parsing rule configured to extract a named value based on the received log data;
    identifying a conflict between the first parsing rule and the second parsing rule;
    resolving the conflict; and
    extracting the named value using a combination of the first parsing rule and the second parsing rule.

* * * * *